United States Patent
Hodges et al.

(10) Patent No.: US 9,674,876 B2
(45) Date of Patent: Jun. 6, 2017

(54) LOCAL DATA BI-CASTING BETWEEN CORE NETWORK AND RADIO ACCESS

(75) Inventors: Philip Hodges, Melbourne (AU); Karl Hellwig, Wonfurt (DE); Paul Schliwa-Bertling, Ljungsbro (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 280 days.

(21) Appl. No.: 13/123,365

(22) PCT Filed: Jan. 19, 2011

(86) PCT No.: PCT/EP2011/050699
§ 371 (c)(1),
(2), (4) Date: Sep. 27, 2013

(87) PCT Pub. No.: WO2012/097870
PCT Pub. Date: Jul. 26, 2012

(65) Prior Publication Data
US 2014/0010167 A1 Jan. 9, 2014

(51) Int. Cl.
*H04W 76/02* (2009.01)
*H04W 88/16* (2009.01)

(52) U.S. Cl.
CPC .......... *H04W 76/02* (2013.01); *H04W 88/16* (2013.01)

(58) Field of Classification Search
CPC ..... H04W 8/082; H04W 28/06; H04W 40/02; H04W 76/00; H04W 76/02;
(Continued)

(56) References Cited

U.S. PATENT DOCUMENTS 6,958,983 B2 * 10/2005 Musikka et al. ............... 370/329
7,385,947 B2 * 6/2008 Wu ........................ H04W 88/08
370/328

(Continued)

FOREIGN PATENT DOCUMENTS

WO    WO 2009060046 A1 *  5/2009

*Primary Examiner* — Michael Thier
*Assistant Examiner* — Eric Nowlin
(74) *Attorney, Agent, or Firm* — Leffler Intellectual Property Law, PLLC

(57) ABSTRACT

The invention relates to a method for setting up a connection between an originating mobile entity and a terminating mobile entity connecting to the same radio access network of a mobile communications network, the radio access network accessing a core network through a serving access gateway serving one of the two mobile entities the method performed by the serving access gateway comprising the steps of receiving a connection setup message for establishing the connection between the originating and the terminating mobile entity, wherein the connection setup message transmitted along a signalling path in the core network comprises an information element storing media plane access needs of at least one network node in the signalling path of the core network, wherein the media plane access needs indicate the needs of a network node in the signal path of the core network to access a media plane of the connection to be set up. Additionally it is checked whether any of the network nodes in the signalling path of the core network needs access to the media plane of said connection to be set up, wherein, if none of the network nodes needs access to the media plane and if the serving access gateway needs access to the media plane at least the following steps are carried out: a media gateway that is handling a media stream of the serving access gateway is instructed to provide an uplink endpoint for the connection to the originating mobile entity and an uplink endpoint for the connection to the terminating (Continued)

mobile entity for the connection to be set up, and the radio access network is informed to transmit the media stream of the originating and the terminating mobile entity to the media gateway of the serving access gateway needing access to the media plane.

12 Claims, 8 Drawing Sheets

(58) Field of Classification Search
CPC . H04W 76/022; H04W 80/04; H04W 84/045; H04W 88/08; H04W 88/12; H04W 88/14; H04W 88/16; H04W 92/045; H04W 92/06; H04W 92/12; H04W 92/14; H04W 92/18; H04W 92/20; H04W 92/22; H04W 12/02; H04W 12/06; H04W 28/10; H04W 76/021; H04W 92/24; H04L 29/06027; H04L 45/00; H04L 65/1016; H04L 65/1026; H04L 65/1036; H04L 65/1043; H04L 65/1069; H04L 65/80; H04L 69/22; H04M 7/006
See application file for complete search history.

(56) References Cited

U.S. PATENT DOCUMENTS

| | | | | |
|---|---|---|---|---|
| 7,738,370 | B2* | 6/2010 | Bachmutsky | H04L 47/10 370/230 |
| 8,797,905 | B2* | 8/2014 | Anthony, Jr. | H04L 43/00 370/252 |
| 8,891,397 | B2* | 11/2014 | Anthony, Jr. | H04L 43/00 370/252 |
| 8,964,637 | B2* | 2/2015 | Parolari | H04W 8/082 370/328 |
| 9,307,450 | B2* | 4/2016 | Skog | H04W 28/14 |
| 2002/0072364 | A1* | 6/2002 | Tamura | H04W 36/10 455/432.2 |
| 2002/0097693 | A1* | 7/2002 | Costa | H04W 76/041 370/329 |
| 2004/0185836 | A1* | 9/2004 | Pelaez | H04M 3/2281 455/414.1 |
| 2006/0251008 | A1* | 11/2006 | Wu | H04W 88/08 370/328 |
| 2006/0268900 | A1* | 11/2006 | Larsson et al. | 370/401 |
| 2008/0310404 | A1* | 12/2008 | Valme | H04M 7/006 370/353 |
| 2009/0220091 | A1* | 9/2009 | Howard | H04L 63/0428 380/277 |
| 2010/0061328 | A1* | 3/2010 | Walldeen et al. | H04W 76/041 370/329 |
| 2011/0110295 | A1* | 5/2011 | Parolari | H04W 8/082 370/328 |
| 2011/0125820 | A1* | 5/2011 | Lin | H04L 67/2842 709/201 |
| 2012/0093167 | A1* | 4/2012 | Velandy et al. | 370/401 |
| 2012/0178453 | A1* | 7/2012 | Kampmann | H04W 76/041 455/436 |
| 2012/0191862 | A1* | 7/2012 | Kovvali | H04L 29/0881 709/227 |
| 2012/0270554 | A1* | 10/2012 | Hellwig | H04L 63/30 455/445 |
| 2013/0003697 | A1* | 1/2013 | Adjakple | H04W 36/0011 370/331 |
| 2013/0286869 | A1* | 10/2013 | Woelker | H04L 63/30 370/252 |
| 2014/0010167 | A1* | 1/2014 | Hodges | H04W 76/02 370/329 |
| 2014/0043980 | A1* | 2/2014 | Anthony, Jr. | H04L 43/00 370/241 |
| 2014/0044019 | A1* | 2/2014 | Anthony, Jr. | H04L 43/00 370/259 |
| 2014/0064188 | A1* | 3/2014 | D'Souza | H04W 88/16 370/328 |
| 2014/0241315 | A1* | 8/2014 | Niu | H04L 67/1091 370/331 |
| 2015/0016256 | A1* | 1/2015 | Skog | H04W 28/14 370/235 |
| 2015/0085784 | A1* | 3/2015 | Yu | H04W 16/14 370/329 |
| 2016/0127420 | A1* | 5/2016 | Yu | H04L 63/304 726/30 |
| 2017/0013640 | A1* | 1/2017 | Loehr | H04W 76/023 |

* cited by examiner

LOCAL DATA BI-CASTING BETWEEN CORE NETWORK AND RADIO ACCESS

TECHNICAL FIELD

The present invention relates to a method for setting up a connection between an originating mobile entity and a terminating mobile entity connecting to the same radio access network of a mobile communications network, to an access gateway setting up the connection between the two mobile entities and to a media gateway setting up the connection of the media plane between the two mobile entities. Furthermore, the invention relates to the radio access network connecting the two mobile entities.

RELATED ART

For voice calls the current mobile communications networks always establish the user plane path through the radio access networks (RANs) and the core networks (CNs) at call setup and always keep it during the whole call time. Therefore any node in the voice path has at any time access to the user plane, i.e. it can read the data from the user plane (e.g. for multi-party conferences or for lawful interception) and it can write/insert data into the user plane (e.g. for multi-party conferences or announcements). There is no need to signal this explicitly at call setup. Most "supplementary services" reside within the core network and take advantage of this simple user plane access.

In some countries and networks the number of voice calls that originate and terminate within one area (city or region) are rather high: so called "local calls". In some cases the two users reside even within one radio cell. The link to that radio cell is often rather expensive, e.g. via long microwave links or even via satellite. It seems therefore attractive to identify such calls and provide a direct "shortcut" within the radio cell or radio network without using the while speech path through the core network. This idea is termed "Local Call Local Switch" (LCLS). The hope is that these users will benefit from higher voice quality and lower speech path delay while at the same time the operator can benefit by reduced cost of operation. In this application this functionality is also called "local shortcut".

It was recently agreed that in 3GPP that all existing supplementary services shall be available to the users, if wanted, even when they reside within one cell and the local shortcut would be possible and preferred otherwise. In order to determine user data connectivity during local shortcut it is agreed that a negotiation mechanism will be used that allows each node in the path to indicate if they need read or write access or not and thus whether they permit the call to be completely switched locally in the BSS or whether user data is bi-cast through the core network.

As described above the current mobile networks assume that the user plane is accessible at any time; local shortcut is not known and not supported.

In order to fulfil both wishes:
a) local shortcut whenever possible, but
b) supplementary services and other network features are available, if wanted; new signalling methods are needed.

When a core network node wishes to read the data uplink from both mobile entities, for example for lawful interception, this requires the user data to be transmitted through the core network. This has the major disadvantage that the core network must be kept through connected and active. All pooled resources or transcoders are kept linked in the user plane.

SUMMARY

Accordingly a need exists to provide a possibility to use the local shortcut whenever possible while providing supplementary services to at least some of the core network nodes.

This need is met by the features of the independent claims. In the dependent claims preferred embodiments of the invention are described.

According to a first aspect of the invention a method for setting up a connection between an originating mobile entity and a terminating mobile entity connecting to the same radio access network of a mobile communications network is provided, the radio access network accessing the core network through a serving access gateway serving one of the two mobile entities. In the serving access gateway at least the following steps are carried out: a connection setup message for establishing the connection between the originating and a terminating mobile entity is received, wherein the connection setup message transmitted along a signalling path in the core network comprises an information element storing media plane access needs of at least one network node in the signalling path of the core network. The media plane access needs indicate the needs of a network node in the signalling path of the core network to access a media plane of the connection to be set up. In a further step it is checked whether any of the network nodes in the signalling path of the core network needs access to the media plane of the connection to be set up. If none of the network nodes needs access to the media plane and if the serving access gateway needs access to the media plane the following steps are carried out: a media gateway that is handling the media stream of the serving access gateway is instructed to provide an uplink endpoint for the connection to the originating mobile entity and an uplink endpoint for the connection to the terminating mobile entity for the connection to be set up. Furthermore, the radio access network is informed to transmit the media stream of the originating and the terminating mobile entity to the media gateway of the serving access gateway needing access to the media plane. With the claimed method the radio access network is enabled to bi-cast the required user plane data locally at the serving access gateway that requires the data and not through the core network. If a serving node requires read access for both mobile entities, then instead of indicating this to the other nodes, e.g. during an LCLS negotiation, the serving access gateway requiring read access receives the required media stream and can add the supplementary services to the user data as needed. This furthermore helps to reduce the traffic in the core network.

The invention furthermore relates to the access gateway itself configured to set up the connection between the originating and the terminating mobile entity connecting to the same radio access network. The access gateway serves one of the two mobile entities and provides access to a core network for the radio access network. The access gateway comprises a receiver configured to receive the connection setup message for establishing the connection between the originating and the terminating mobile entity. The connection setup message is transmitted along a signalling path in the core network and comprises an information element storing the media plane access needs of at least one network node in the signalling path. Furthermore a processing unit is provided configured to check whether any of the network nodes in the signalling paths of the core network needs access to the media plane of the connection to be set up. When the processing unit determines that none of the network nodes needs access to the media plane and if the access gateway serving one of the mobile entities needs access to the media plane, the processing unit is configured to instruct a media gateway that is handling the media stream of the serving access gateway to provide an uplink endpoint for the connection to the originating mobile entity and an uplink endpoint for the connection to the terminating mobile entity for the connection to be set up. Furthermore the processing unit is configured to inform a radio access network to transmit the media stream of the originating and the terminating mobile entity to the media gateway of the serving access gateway needing access to the media plane. The serving access gateway configures each media gateway to support two uplink endpoints. This configuration is then indicated to the radio access network that can react accordingly.

The invention furthermore relates to the media gateway setting up the connection of the media plane for the connection between the originating mobile entity and the terminating mobile entity connecting to the same radio access network. As mentioned above the radio access network accesses the core network through a serving access gateway serving one of the two mobile entities. The media gateway comprises a plurality of endpoints for connecting media planes of mobile entity related calls. Furthermore a receiver is provided receiving a message from the serving access gateway serving one of the two mobile entities the message containing the information to provide an uplink endpoint for the connection to the originating mobile entity and an uplink endpoint for the connection to the terminating mobile entity. Furthermore an endpoint control unit is provided providing the uplink endpoint for the connection to the originating mobile entity and an uplink endpoint connection to the terminating mobile entity in accordance with the information contained in the received message.

The invention furthermore relates to the radio access network connecting the originating mobile entity and the terminating mobile entity to the core network through a serving access gateway that needs access to the media plane. The radio access gateway comprises a receiver receiving a message from the serving access gateway containing the information to transmit a media stream of the originating and the terminating mobile entity to the media gateway of the serving access gateway needing access to the media plane. Furthermore, a transceiver unit is provided configured to transmit the media stream of the originating and the terminating mobile entity to the media gateway of the serving access gateway in accordance with the information received. The radio access network receiving the indication from the media gateway supporting two uplink endpoints bi-casts its local data stream and also the local shortcut stream from the other party.

In one embodiment the serving access gateway can be the terminating access gateway for the connection to be set up. However the serving access gateway can also be the originating access gateway for the connection to be set up.

BRIEF DESCRIPTION OF THE DRAWINGS

The invention will be described in further detail below with reference to the accompanying drawings, in which.

DETAILED DESCRIPTION

In the embodiments below the invention will be described in connection with mobile-to-mobile voice calls. However the present invention can be used with any real-time mobile-to-mobile communication like video telephony or multimedia communication in general.

Figure 1:
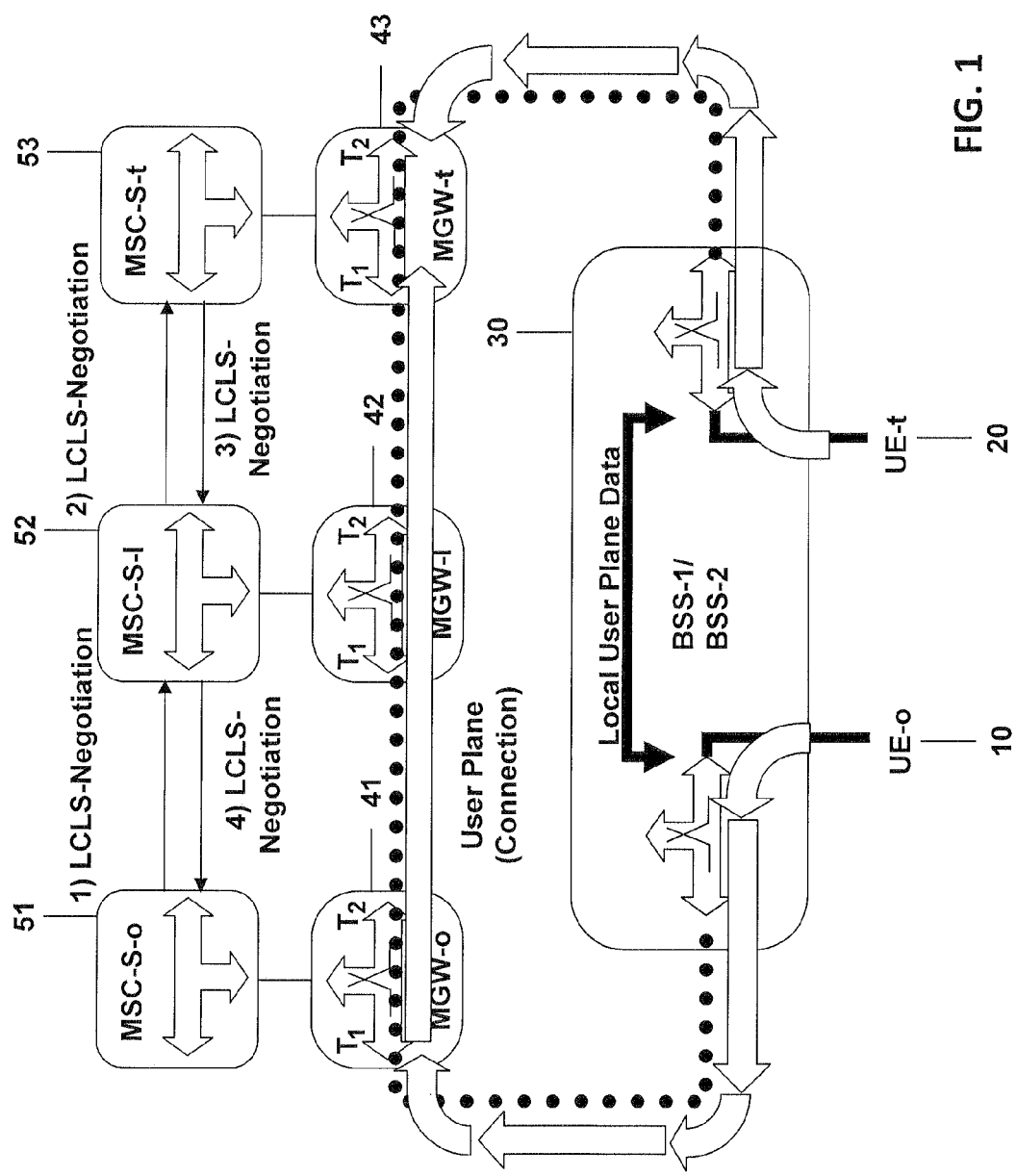
FIG. 1 shows an embodiment where the user plane is transmitted through the core network.

In FIG. 1 an embodiment of the prior art is shown where the user plane is transmitted through the core network if one of the core network nodes needs access to the user plane.

A mobile entity 10 makes a call to another mobile entity, here the mobile entity 20. Both mobile entities, the originating mobile entity 10 and the terminating mobile entity, are located within the same radio cell or radio access network 30. In order to determine whether the call is a call where the local shortcut can be used without using the whole speech path through the core network the "local call local switch" (LCLS) functionality is used. This functionality as a negotiation mechanism allowing each node in the path to indicate whether it needs access (read or write). To this end the connection setup message for setting up the connection between the two mobile entities 10 and 20 comprises an information element storing media plane access needs of a network node in the signalling path of the core network. If a network node needs access to the media plane, here the voice call, this information can be included into the connection setup message. This connection setup message is sent from an originating access gateway, in FIG. 1 the originating MSC server 51 through an intermediate MSC server 52 to the terminating MSC server. This call setup message is transmitted from the originating access gateway to the terminating access gateway and back as indicated by the four arrows between the MSC servers shown in FIG. 1 named LCLS negotiation. In the embodiment shown the terminating MSC server 53 needs access to the media plane, the other two network nodes 51 and 52 of the core network not needing access to the media plane. The messages of arrows 1) and 2) indicate that no read/write access is needed. The terminating MSC server 53 now includes its media plane access needs into the connection setup message that is returned back to the originating MSC server 51. As a consequence the messages of arrows 3) and 4) would contain the read/write access needs. Thus, the media plane data indicated by the thick arrows are transmitted through the corresponding media gateways 41-43 of the core network. In the embodiment shown each media gateway has two corresponding terminations T1 and T2 for connecting the user plane/speech data. As can be seen from FIG. 1 the inconvenience of this embodiment of the prior art is that if one of the two serving access gateways needs access to the media plane, the media plane is through connected through the core network.

In the present invention, if a core network node receives the LCLS negotiation indicating that no other node requires read access and if the serving node requires read or write access for both mobile entities, the node requiring read access configures its media gateway to support two uplink endpoints. This configuration is then indicated to the radio access network via the LCLS configuration information element with a new setting to inform the radio access network to bi-cast uplink both its data stream and also the local shortcut stream of the other party. Furthermore the serving network node needing access does not include its need into the connection setup message as done in the embodiment of FIG. 1, as this would trigger the transmission of the user plane data through the core network.

Figure 2:
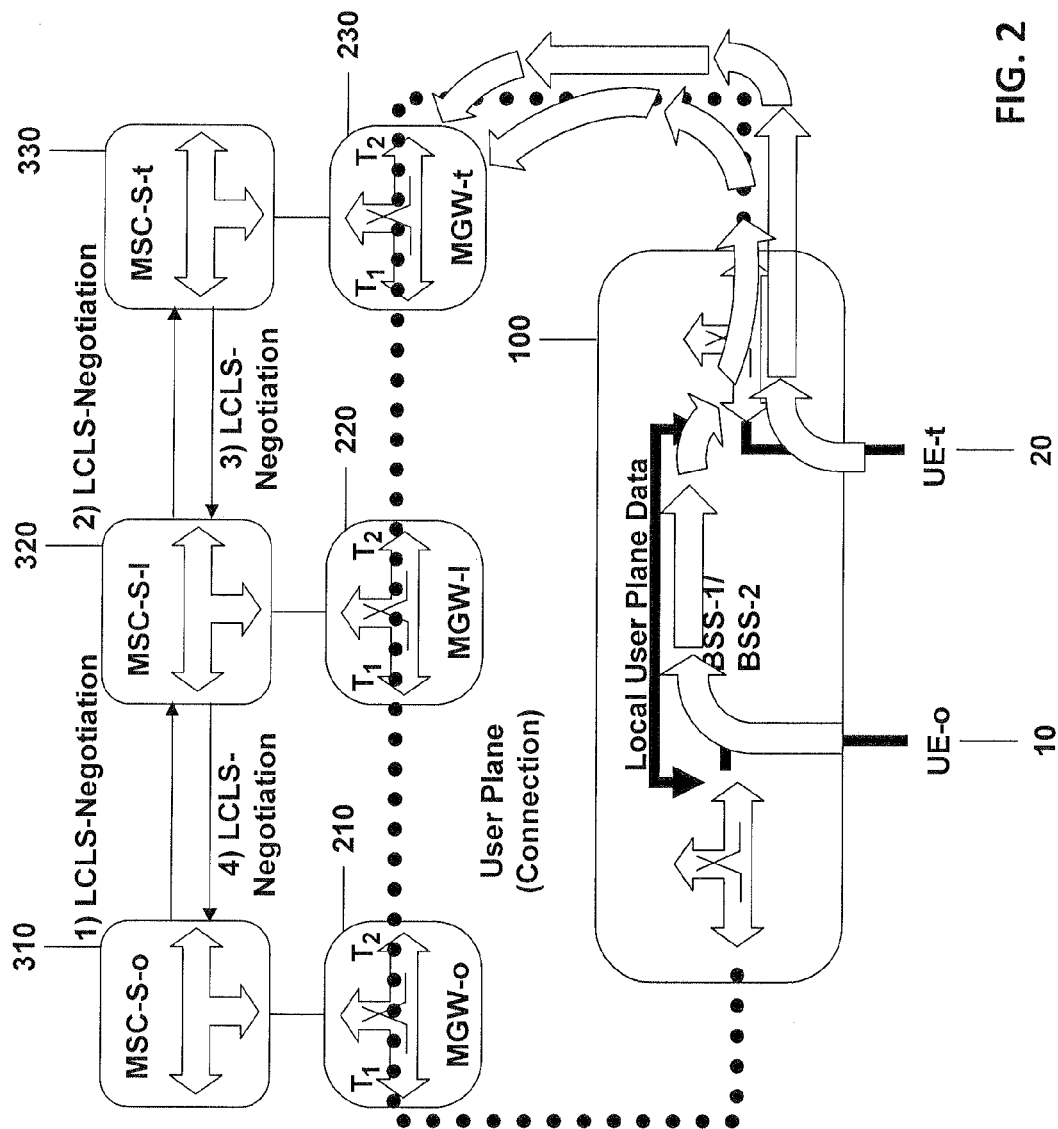
FIG. 2 shows an embodiment where the terminating access gateway needs access to the media plane.

In the embodiment shown in FIG. 2 the present invention is explained in more detail. In the embodiment shown the terminating access gateway, the MSC server 330, needs access to the media plane. The connection setup message is transmitted from the originating MSC server 310 via the intermediate MSC server 320 to the terminating MSC server. As none of the two preceding networks nodes needs access to the media plane and as the MSC server 330 is a serving access point, it does not include its media plane access need into the connection setup message. As a consequence when the connection setup message is returned to MSC server 310 no read or write access can be deduced from the information element indicating the media plane access needs of the different network nodes. As a result the serving MSC server 310 does not request the media plane connection through the core network. The terminating server 330 indicates its media plane access needs to the media gateway 230 to support the two media streams, the media stream from the mobile entity 10 and the media stream from the mobile entity 20 as shown by the two thick arrows in the embodiment of FIG. 2. Accordingly the media gateway has to be configured to support the two uplink endpoints.

In general terms the serving access gateway can be a terminating and/or originating access gateway for the connection to be set up.

Furthermore in general terms the step of instructing the media gateway comprises the step of instructing to provide the uplink endpoint for the connection to the originating mobile entity and an uplink endpoint for the connection to the terminating mobile entity. In this context two possibilities exist. In a first embodiment the step of instructing the media gateway comprises the step of instructing the media gateway to use an endpoint to receive the uplink media stream of the other of the two mobile entities that is different from the uplink endpoint where the uplink media stream of the served mobile entity is received. In the other embodiment the media gateway is informed to use the same endpoint already used for receiving the media stream of the served mobile entity and to configure this endpoint in such a way that the uplink media stream of both the served and the other mobile entity are received at the same endpoint.

Furthermore, in general terms, it can be deduced from the above that the serving access gateway does not include the information in the information element that it needs access to the media plane of the connection to be set up. However, instead of not including the information in the information element the serving access gateway may include the information in the information element that it needs access to the media plane of the connection to be set up. In this example the serving access gateway might further include the information in the information element that it is an originating or a terminating access gateway able to request the media plane access from both mobile entities directly from the radio access network.

As can been seen from the embodiment of FIG. 2 the mobile network architecture is assumed to be based on separate control plane and user plane as described inter alia in 3GPP TS 23.205 where the MSC server controls and the media gateway connects the user plane in the call network to the user plane in the radio access network. The present invention is described in a transport agnostic manner and the details may depend on whether the transport technology is TDM (time division multiplex), ATM (asynchronous transfer mode) or IP (internet protocol).

The access gateways shown in FIG. 2 are configured to control the connection of the media stream of the core network to the media stream of the radio access network.

Figure 3:
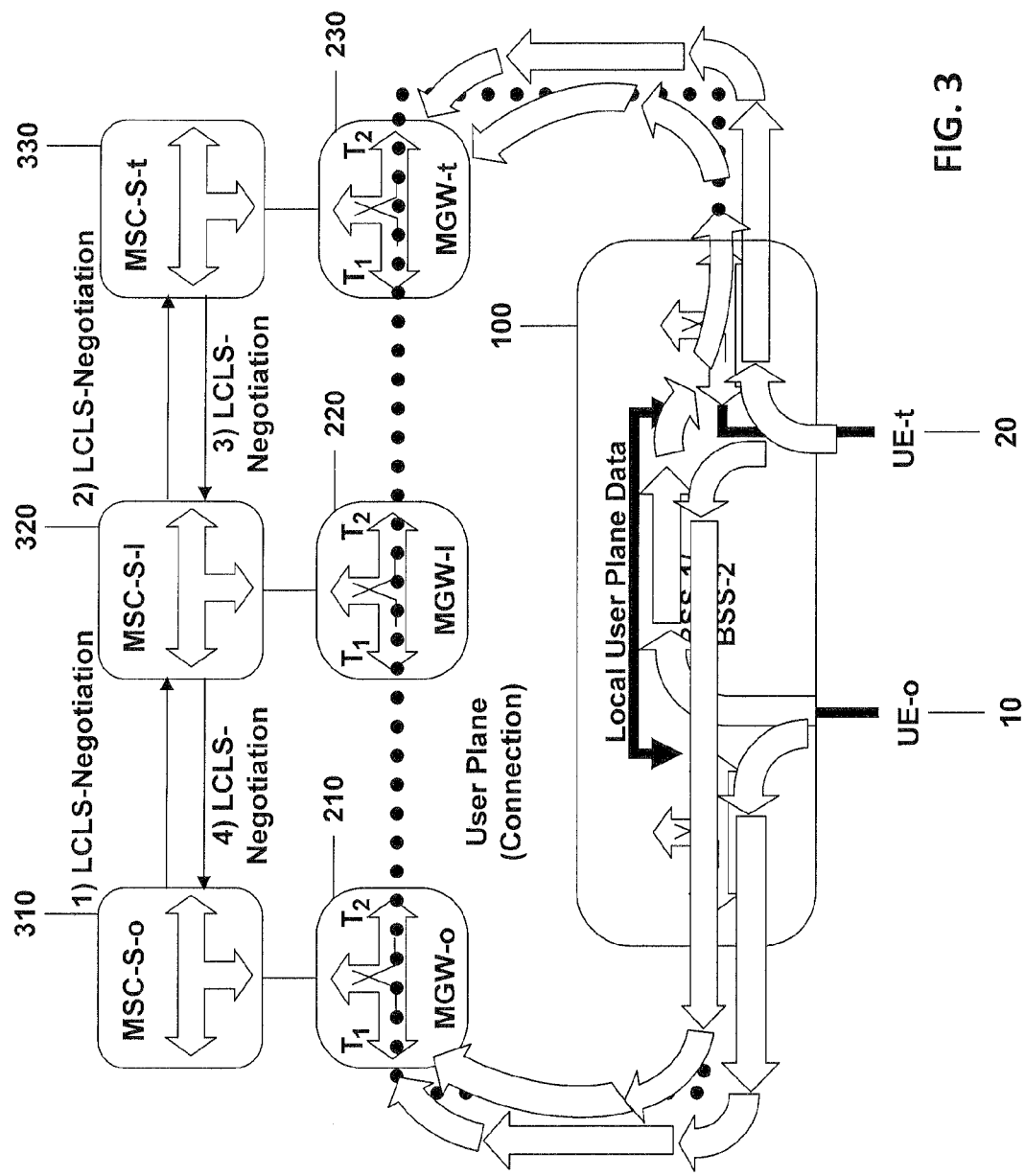
FIG. 3 shows an embodiment where the terminating and the originating access gateway need access to the user plane.

In FIG. 3 another embodiment is shown where both the originating node and the terminating node require read access. As a consequence the same concept as described in connection with FIG. 2 applies and both media gateways, the media gateway 210 and 230, are instructed to receive the user plane data of the originating and the terminating mobile entities 10 and 20. Again neither the originating access gateway nor the terminating access gateway includes the information of the media plane access need into the connection setup message. The originating serving MSC 310 avoids signalling its read access requirements and depending on what is received in the response decides whether to apply the behaviour of requesting the radio access network to bi-cast the uplink just its own locally served mobile station user data or whether to request both mobile stations' user data.

This can be achieved via a new LCLS configuration which indicates that the radio access network should bi-cast both mobile entities' user data. In the same way the terminating MSC 330 can also avoid signalling its read access requirements in the LCLS negotiation response if it needs read access, but does not receive any request for the read access from a preceding node. In FIGS. 2 and 3 the dotted lines indicate the conventional path of the originating mobile entity user data. As can be seen from FIGS. 2 and 3 a media gateway will need to be configured to receive two one directional uplink streams. As mentioned above, this can be obtained by using a separate termination/endpoint specifically for the uplink data of each mobile entity.

Figure 4:
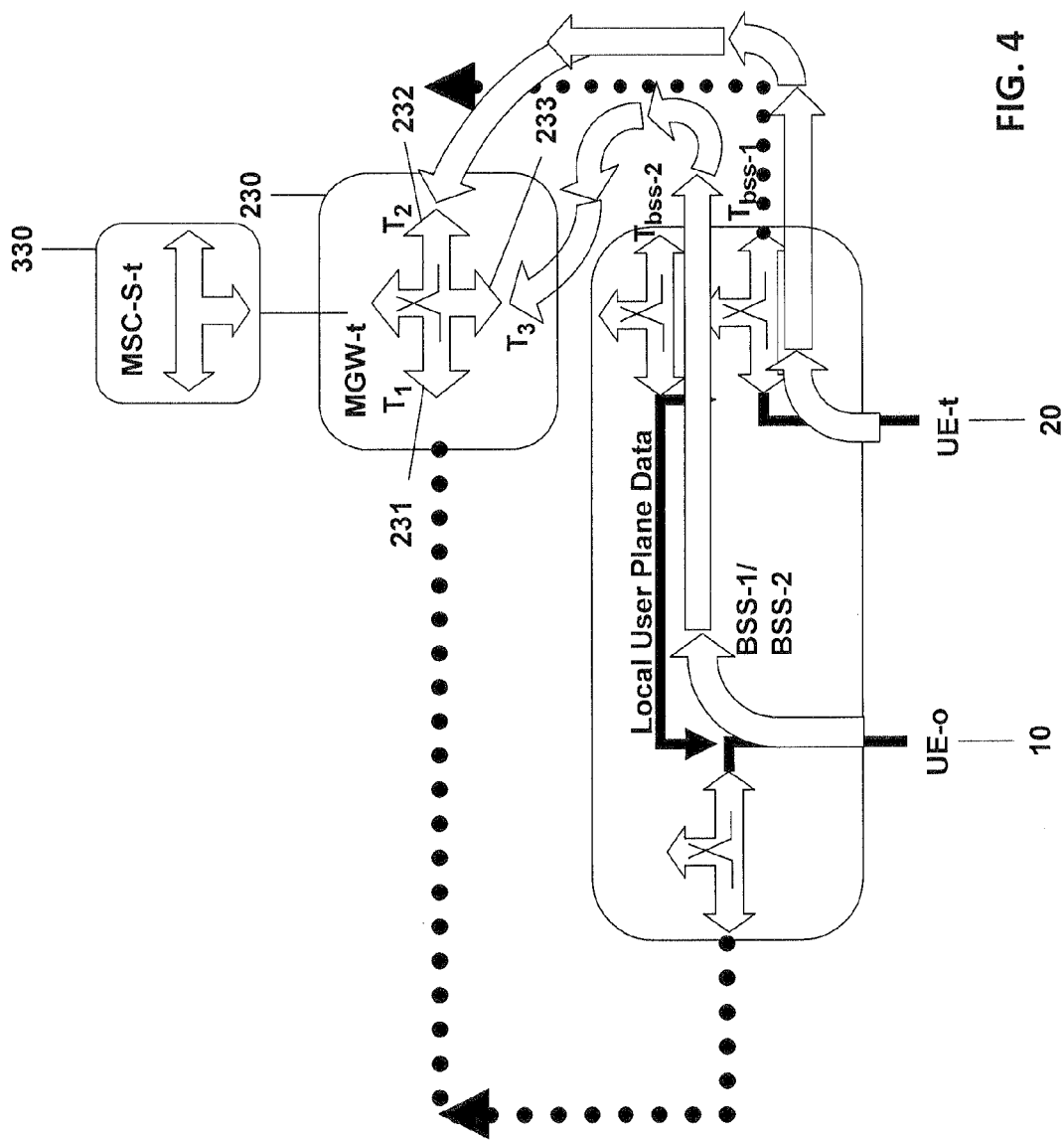
FIG. 4 shows a more detailed view of the media gateway receiving the media stream from both mobile entities.

This embodiment is shown in more detail in FIG. 4. The MSC server 330 needing access to the media plane indicates its need to the media gateway 230. As shown in FIG. 4 a separate termination, here termination 233 is configured in addition to the other two terminations 231 and 232 used for transmitting the user plane data of the terminating mobile entity 20. In the embodiment shown in FIG. 4 the termination for the mobile entity 20 remains unchanged. However, in another embodiment the media gateway may also be adapted to change the normal signal stream "bothway" stream mode to having dual streams per termination and defining their modes as incoming modes.

Figure 5:
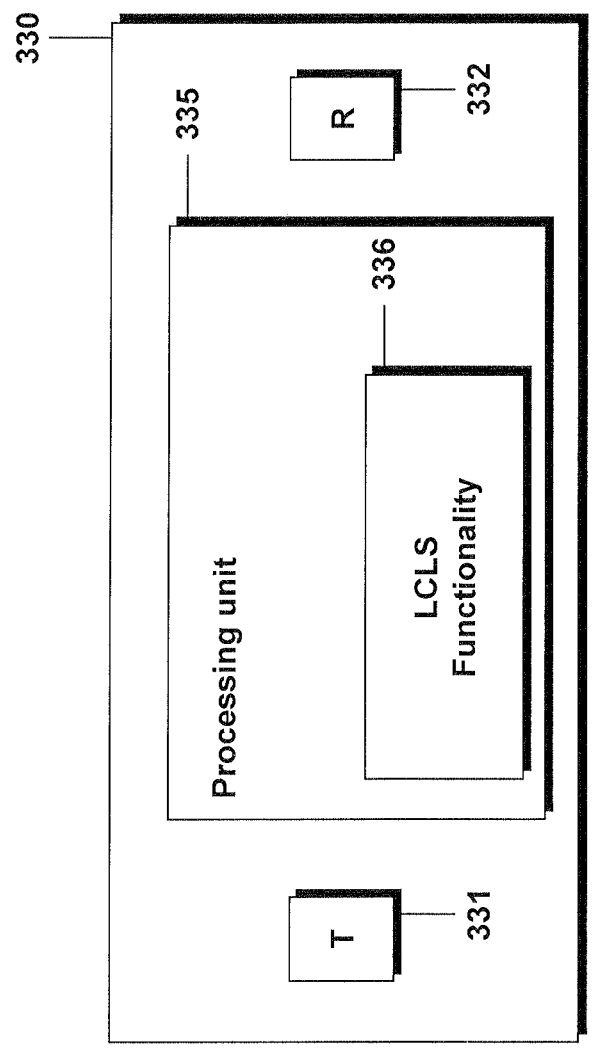
FIG. 5 shows a schematic view of a serving access gateway needing access to a media plane.
Figure 6:
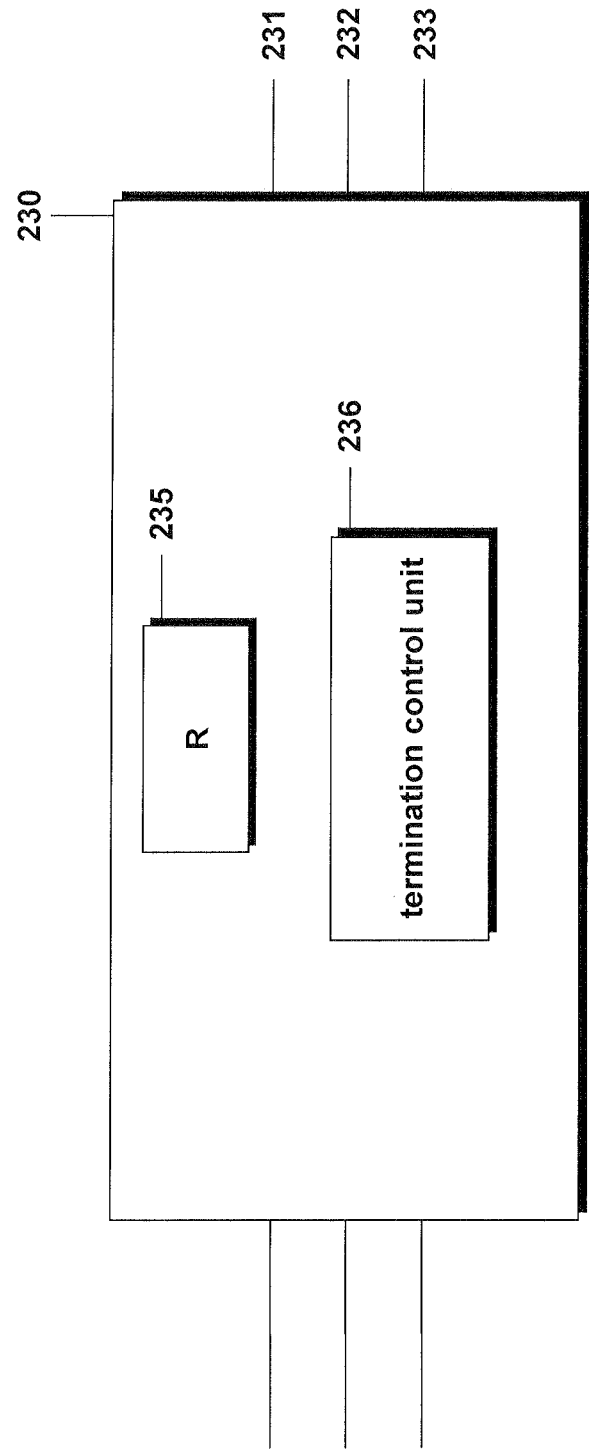
FIG. 6 shows a schematic view of a media gateway controlled by the access gateway shown in FIG. 5.
Figure 7:
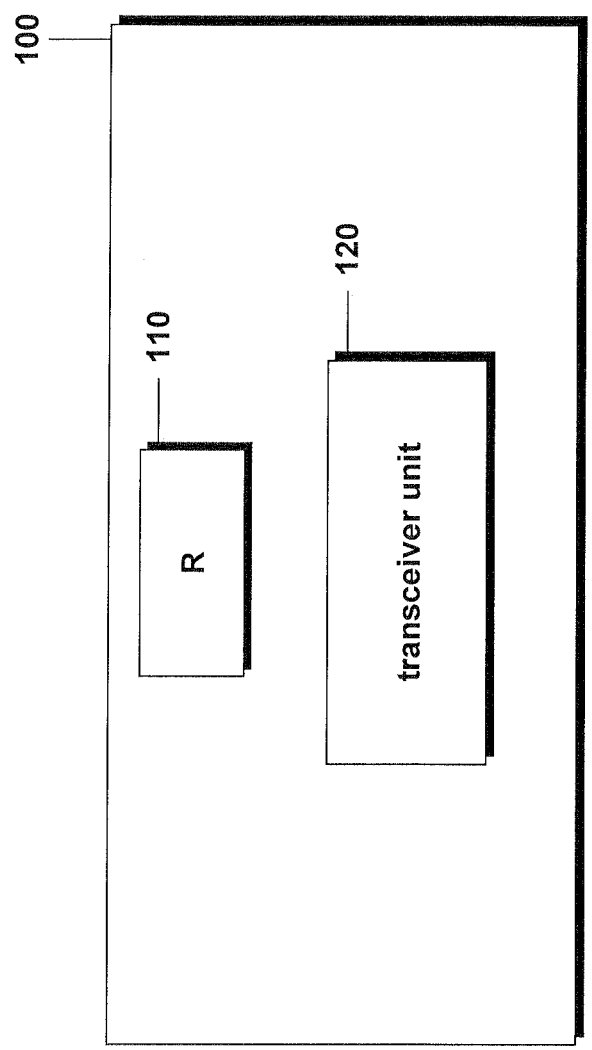
FIG. 7 shows a schematic view of the radio access network.

In FIG. 5 a schematic view of an MSC server 330 is shown, FIG. 6 showing a schematic view of the media gateway and FIG. 7 showing a schematic view of the radio access network. In the embodiments shown in FIGS. 5-7 only the components of the different entities are disclosed which are needed for the understanding of the present invention. It should be understood that the entities shown, the access gateway, the media gateway and the radio access network comprise additional functional entities, which were however omitted for the sake of clarity. Furthermore the entities shown in connection with FIGS. 5-7 are shown as separate entities. The functional entities shown in these Figs. could be designed in other functional entities. Furthermore, the entities shown could be designed by a hardware or software processed by one or more processors or by a combination of hardware and software.

The MSC server 330 shown in FIG. 5 comprises a processing unit 335 including an LCLS functionality 336 where the media plane access needs of the access gateway are processed. The processing unit 335 checks whether any of the other network nodes needs access to the media plane by accessing an information element contained in the connection setup message showing the access needs of other core network nodes to the user plane. Furthermore the processing unit is configured to instruct the media gateway to use either one termination or different terminations for the uplink media streams of the two mobile entities if media stream access is needed. The LCLS functionality 336 can be configured in such a way that the media plane access needs will not be incorporated into the information element. In another embodiment the LCLS functionality could indicate that it requires read access such that subsequent nodes know that it is the originating or terminating node requiring read access. If no other node requires read access then the originating and/or the terminating MSC server can act as described in connection with FIGS. 2-4. The LCLS functionality could add further parameters instead of just indicating its read/write access needs. By way of example an addition parameter could be included indicating that the parameter was set by an originating or terminating network node indicating to succeeding nodes that it requires access to the media plane but can request it locally.

The MSC server 330 shown in FIG. 5 furthermore contains the transmitter and receiver 331 and 332 to transmit messages to other network nodes or to the media gateway 230 shown in FIG. 6. The media gateway shown in FIG. 6 comprises the different terminations 231, 232 and 233 and a termination control unit 236 allowing the configuration of the terminations in accordance with the information received from the media gateway controller, here the MSC server 330 via the receiver 335.

The termination control unit 236 is configured to provide the uplink endpoint for the connection to the other of the two mobile entities that is different from the uplink endpoint where the uplink media stream of the served mobile entity is received or in another embodiment the termination control unit 236 is configured to provide a single uplink termination that is configured to receive the uplink media streams of both the served and the other mobile entity.

In FIG. 7 a schematic view of the radio access network is shown. This radio access network symbolically comprises a receiver for receiving the information to transmit user plane data of both mobile entities to the terminating and/or originating access gateway. This is obtained by the transceiver unit 120 transmitting the media streams in accordance with the information received from the MSC server 330/media gateway 230.

Figure 8:
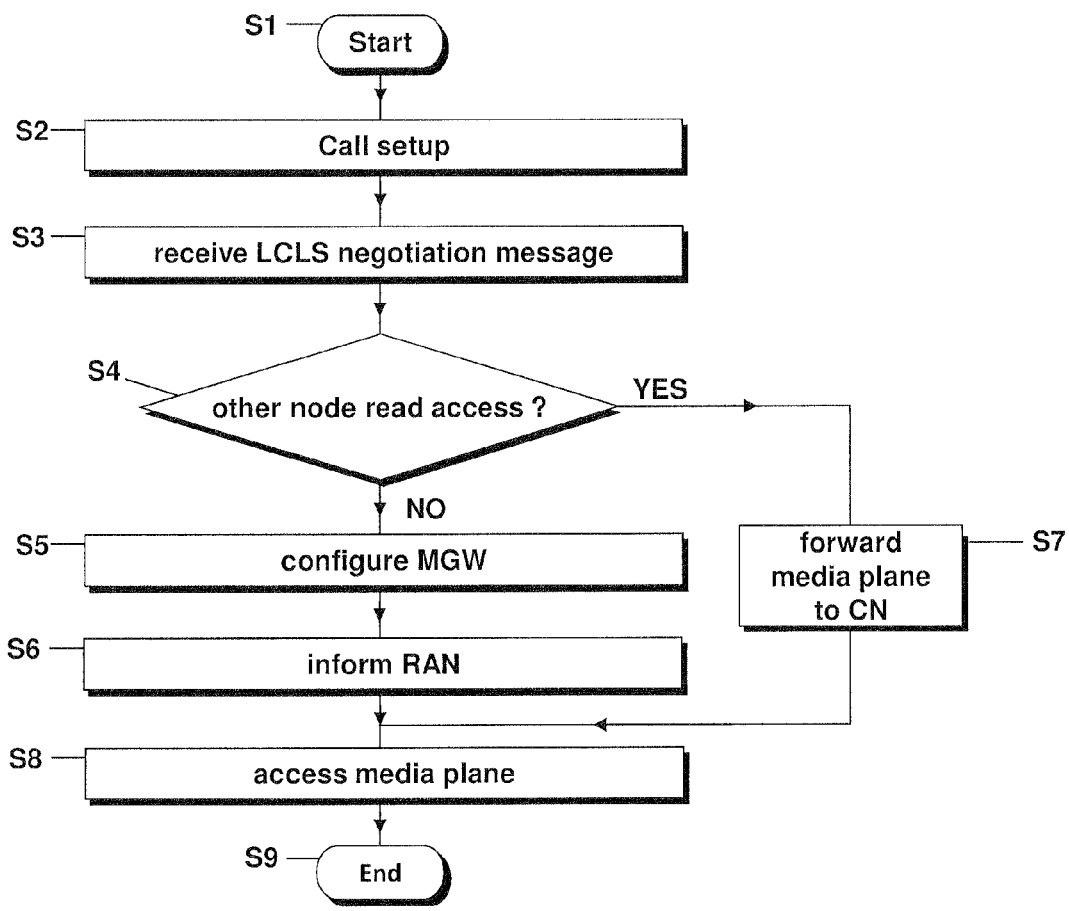
FIG. 8 shows a flow chart with the main steps allowing a local shortcut without a transmission of the media plane through the core network.

In connection with FIG. 8 the steps are summarised that are carried out allowing an intermediate node of a core network not to receive user plane data when a local shortcut is used. The method starts in step S1. In the next step S2 a call is set up between the originating mobile entity 10 and the terminating mobile entity 20. To this end a connection setup message is transmitted from the originating to the terminating mobile entity including an LCLS negotiation message indicating the media plane access needs of other network nodes which have already received said message (step S2). The steps shown in FIG. 8 may be carried out by a terminating or an originating access gateway. When the negotiation message has been received in step S3 it is checked in step S4, whether any other node having received this message needs access to the media plane. If the node receiving the message however needs access to the media plane and if no other node needs access, the media plane may not be forwarded to the core network and the media gateway may be configured in step S5 to support the reception of the media plane of both mobile entities. Furthermore in step S6 the radio access network is informed so that the latter can transmit the media plane of both mobile entities to the corresponding media gateway controlled by the MSC server needing access. If it is determined in step S4 that other nodes in the signalling path need access to the media plane and if this other node is not a terminating or originating access node that can access the media plane locally as described above, then the media plane is forwarded through the core network. In step S8 the media plane can be accessed by the MSC server needing access, the method ending in step S9.

Summarising, the present invention allows a core network intermediate node to remove their through connectivity when a call is locally switched and only local read or write access is required.

The invention claimed is:

1. A method for setting up a connection between an originating mobile entity and a terminating mobile entity in a mobile communications network, wherein the mobile communications network comprises one or more radio access networks and a core network, wherein the core network comprises a control plane and a media plane, wherein the control plane comprises a serving access gateway, and the media plane comprises a media gateway that is handling a media stream of the serving access gateway, wherein the originating mobile entity and the terminating mobile entity are connecting to a same radio access network of the one or more radio access networks, the same radio access network accessing the core network through a the serving access gateway serving one of the two mobile entities, the method performed by the serving access gateway comprising the steps of:

receiving, from an other node in the control plane of the core network, a connection setup message for establishing the connection between the originating mobile entity and the terminating mobile entity, wherein the connection setup message is transmitted along a signalling path in the control plane of the core network and comprises an information element storing media plane access needs of at least one other core network node in the signalling path of the control plane of the core network, wherein the media plane access needs indicate whether at least one of the other core network nodes in the signalling path of the control plane of the core network needs to access a the media plane of the connection to be set up;

checking the received information element, and if the received information element indicates that none of the other core network nodes in the control plane of the core network needs access to the media plane and if the serving access gateway needs access to the media plane, at least the following steps are carried out:

instructing a the media gateway that is handling a media stream of the serving access gateway to provide an uplink endpoint for the connection to the originating mobile entity and an uplink endpoint for the connection to the terminating mobile entity for the connection to be set up;

informing the same radio access network to bi-cast uplink both the media stream of the originating mobile entity and a local shortcut media stream of the terminating mobile entity by transmitting the media stream of the originating mobile entity and 4 the local shortcut media stream of the terminating mobile entity to the media gateway of the serving access gateway needing access to the media plane; and communicating the connection setup message to one of the other nodes in the control plane of the core network in a manner that informs other nodes in the control plane of the core network that the serving access gateway does not require other nodes within the media plane of the core network to handle user plane data for the connection to be set up, wherein the local shortcut media streams between the originating mobile entity and the terminating mobile entity are routed entirely through the same radio access network.

2. The method according to claim 1, wherein the serving access gateway is a terminating and/or an originating access gateway for the connection to be set up.

3. The method according to claim 1, wherein the step of instructing the media gateway comprises the step of instructing the media gateway to use an endpoint to receive the uplink media stream of the other of the two mobile entities that is different from the uplink endpoint where the uplink media stream of the served mobile entity is received.

4. The method according to claim 1, wherein the step of instructing the media gateway comprises the step of informing the media gateway to use the same endpoint already used for receiving the media stream of the served mobile entity and to configure this endpoint in such a way that the uplink media streams of both the served and the other mobile entity are received at the same endpoint.

5. The method according to claim 1, wherein communicating the connection setup message to one of the other nodes in the control plane of the core network in the manner that informs other nodes in the control plane of the core network that the serving access gateway does not require other nodes within the media plane of the core network to handle user plane data for the connection to be set up comprises:

the serving access gateway not including the information in the information element that it needs access to the media plane of the connection to be set up.

6. The method according to claim 1, wherein communicating the connection setup message to one of the other nodes in the control plane of the core network in the manner that informs other nodes in the control plane of the core network that the serving access gateway does not require other nodes within the media plane of the core network to handle user plane data for the connection to be set up comprises:

the serving access gateway including the information in the information element that it needs access to the media plane of the connection to be set up, and the serving access gateway further including the information in the information element that it is an originating or a terminating access gateway able to request the media plane access from both mobile entities directly from the same radio access network.

7. A serving access gateway configured to set up a connection between an originating mobile entity and a terminating mobile entity in a mobile communications network, wherein the mobile communications network comprises one or more radio access networks and a core network, wherein the core network comprises a control plane and a media plane, wherein the control plane comprises the serving access gateway, and the media plane comprises a media gateway that is handling a media stream of the serving access gateway, wherein the originating mobile entity and the terminating mobile entity are connecting to a same radio access network of the one or more radio access networks, wherein the same radio access network accesses the core network through the serving access gateway serving one of the two mobile entities, the serving access gateway comprising:

a receiver configured to receive, from an other node in the control plane of the core network, a connection setup message for establishing the connection between the originating mobile entity and the terminating mobile entity, wherein the connection setup message is transmitted along a signalling path in the control plane of the core network and comprises an information element storing media plane access needs of at least one other core network node in the signalling path of the control plane of the core network, wherein the media plane access needs indicate whether at least one of the other core network nodes in the signalling path of the control plane of the core network needs to access a the media plane of the connection to be set up; and a processing unit configured to check the received information element and when the processing unit determines that the received information element indicates that none of the other nodes in the control plane of the core network needs access to the media plane and determines that the serving access gateway serving one of the two mobile entities needs access to the media plane, the processing unit is:

configured to instruct the media gateway that is handling the media stream of the serving access gateway to provide an uplink endpoint for the connection to the originating mobile entity and an uplink endpoint for the connection to the terminating mobile entity for the connection to be set up;

configured to inform the same radio access network to bi-cast uplink both the media stream of the originating mobile entity and a local shortcut media stream of the terminating mobile entity by transmitting the media stream of the originating mobile entity and the local shortcut media stream of the terminating mobile entity to the media gateway of the serving access gateway needing access to the media plane; and configured to communicate the connection setup message to one of the other nodes in the control plane of the core network in a manner that informs other nodes in the control plane of the core network that the serving access gateway does not require other nodes within the media plane of the core network to handle user plane data for the connection to be set up, wherein the local shortcut media streams between the originating mobile entity and the terminating mobile entity are routed entirely through the same radio access network.

8. The serving access gateway according to claim 7, further being configured to control a connection of the media stream of the core network to the media stream of the same radio access network.

9. The serving access gateway according to claim 7, wherein the processing unit is configured to instruct the media gateway to use an endpoint to receive the uplink media stream of the other of the two mobile entities that is different from the endpoint where the uplink media stream of the served mobile entity is received.

10. The serving access gateway according to claim 7, wherein the processing unit is configured to instruct the media gateway to use the same endpoint already used for receiving the media stream of the served mobile entity and to configure this endpoint in such a way that the uplink media streams of both the served and the other mobile entity are received at the same endpoint.

11. The serving access gateway according to claim 7, wherein being configured to communicate the connection setup message to one of the other nodes in the control plane of the core network in the manner that informs other nodes in the control plane of the core network that the serving access gateway does not require other nodes within the media plane of the core network to handle user plane data for the connection to be set up comprises:

being configured to not include the information into the information element that it needs access to the media plane of the connection to be set up.

12. The serving access gateway according to claim 7, wherein being configured to communicate the connection setup message to one of the other nodes in the control plane of the core network in the manner that informs other nodes in the control plane of the core network that the serving access gateway does not require other nodes within the media plane of the core network to handle user plane data for the connection to be set up comprises:

being configured to include the information in the information element that it needs access to the media plane of the connection to be set up, the access gateway further including the information in the information element that it is an originating or a terminating access gateway able to request the media plane access from both mobile entities directly from the same radio access network.

* * * * *